(12) United States Patent
Otsuka

(10) Patent No.: US 6,597,104 B2
(45) Date of Patent: Jul. 22, 2003

(54) LANTHANUM PHOSPHATE PHOSPHOR FOR VACUUM ULTRAVIOLET RADIATION, AND RARE GAS DISCHARGE LAMP

(75) Inventor: Reiji Otsuka, Kanagawa (JP)

(73) Assignee: Kasei Optonix, Ltd., Odawara (JP)

( * ) Notice: Subject to any disclaimer, the term of this patent is extended or adjusted under 35 U.S.C. 154(b) by 10 days.

(21) Appl. No.: 10/046,310

(22) Filed: Jan. 16, 2002

(65) Prior Publication Data
US 2002/0096990 A1 Jul. 25, 2002

(30) Foreign Application Priority Data
Jan. 19, 2001 (JP) ........................................ 2001-049435

(51) Int. Cl.⁷ .................................................. H01J 1/62
(52) U.S. Cl. ................. 313/486; 252/500; 252/301.4 R
(58) Field of Search ................................ 313/485, 486, 313/487; 252/500, 301.4 R Primary Examiner—Vip Patel
(74) Attorney, Agent, or Firm—Oblon, Spivak, McClelland, Maier & Neustadt, P.C.

(57) ABSTRACT

A lanthanum phosphate phosphor for vacuum ultraviolet radiation, which is represented by a composition formula of $(La_{1-x-y}Ce_xTb_y)PO_4$, wherein x and y are numbers which satisfy $0 \leq x \leq 0.2$ and $0.05 \leq y \leq 0.3$, respectively, and which emits light when irradiated with vacuum ultraviolet radiation having a wavelength of at most 200 nm.

9 Claims, 2 Drawing Sheets

LANTHANUM PHOSPHATE PHOSPHOR FOR VACUUM ULTRAVIOLET RADIATION, AND RARE GAS DISCHARGE LAMP

BACKGROUND OF THE INVENTION

1. Field of the Invention

The present invention relates to a lanthanum phosphate phosphor for vacuum ultraviolet radiation, which exhibits light emission of high luminance when irradiated with vacuum ultraviolet radiation having a wavelength of at most 200 nm and which is less susceptible to deterioration of emission luminance by an increase of the temperature (temperature quenching), and a rare gas discharge fluorescent lamp (rare gas lamp) which is less susceptible to deterioration of the luminance with time, wherein such a phosphor is used as a fluorescent layer.

2. Discussion of Background

A rare gas lamp is a fluorescent lamp having a rare gas such as Xe, Ar or Xe—Ar sealed in instead of mercury, so that an inside fluorescent layer is excited to emit light by vacuum ultraviolet radiation having a wavelength of at most 200 nm, which is radiated by discharge of such a rare gas. With a fluorescent lamp having mercury sealed in, the saturation vapor pressure of mercury changes due to a change in the surrounding temperature and in the surface temperature of the tube, whereby the emission output from the fluorescent layer changes substantially. Whereas, with the rare gas lamp, the change in the gas density due to a difference in the temperature is little, whereby it can be lighted up instantaneously, and a constant emission output can be obtained. Further, mercury as a hazardous substance is not used, and no environmental pollution results from disposal of such a lamp. Accordingly, it is presently widely used as a light source for information related equipments, such as a light source for reading out of facsimile or a back light for a liquid crystal display.

The rare gas lamp is required not only to have high luminance but also to have little decrease of light flux due to an increase of the surrounding temperature, when it is used as a light source for reading out a manuscript of facsimile. Accordingly, the phosphor to be used as a fluorescent layer of a rare gas lamp is required not only to emit light at high efficiency under excitation with vacuum ultraviolet radiation having a wavelength of at most 200 nm, but also to have little temperature quenching i.e. little decrease in the emission luminance due to an increase of the temperature.

As phosphors for rare gas lamps, a green-emitting phosphor such as $Zn_2SiO_4$:Mn, $LaPO_4$:Ce,Tb or $Y_2SiO_5$:Tb, a blue-emitting phosphor such as $BaMgAl_{10}O_{17}$:Eu or $(Ba,Sr)MgAl_{10}O_{17}$:Eu,Mn, and a red-emitting phosphor $Y_2O_3$:Eu or $(Y,Gd)BO_3$:Eu, are, for example, presently used. Among these phosphors, a lanthanum phosphate phosphor ($LaPO_4$:Ce,Tb) is particularly excellent in that emission luminance under excitation with vacuum ultraviolet radiation is high. However, when this phosphor is used as a fluorescent layer for a lamp, temperature quenching becomes distinct when subjected to heat treatment such as baking treatment in the process for forming the fluorescent layer, and it has a drawback that when the lamp is continuously turned on, as the temperature of the lamp increases, the light flux of the lamp decreases, and the emission luminance decreases. Therefore, an improvement in this respect has been desired.

SUMMARY OF THE INVENTION

The present invention has been made under the above circumstances, and it is an object of the present invention to provide a lanthanum phosphate phosphor for vacuum ultraviolet radiation, whereby there is no temperature quenching and the emission luminance does not substantially decrease even when the temperature rises, and a rare gas lamp whereby the temperature dependency of light flux is little.

In order to accomplish the above object, the present inventor has studied the interrelation between the composition of the lanthanum phosphate phosphor which has been heretofore used and the temperature quenching of the phosphor, in detail. As a result, he has found it possible to remarkably reduce the temperature quenching by adjusting the concentration of the activator, particularly cerium (Ce) and to obtain a rare gas lamp, whereby the decrease of light flux due to a temperature rise of the lamp with time, is little, by using such a phosphor as a fluorescent layer. The present invention has been accomplished on the basis of this discovery.

Thus, the object of the present invention can be accomplished by adopting the following construction.

(1) A lanthanum phosphate phosphor for vacuum ultraviolet radiation, which is represented by a composition formula of $(La_{1-x-y}Ce_xTb_y)PO_4$, wherein x and y are numbers which satisfy $0 \leq x \leq 0.2$ and $0.05 \leq y \leq 0.3$, respectively, and which emits light when irradiated with vacuum ultraviolet radiation having a wavelength of at most 200 nm.

(2) The lanthanum phosphate phosphor for vacuum ultraviolet radiation according to the above (1), wherein x is a number which satisfies $0 \leq x \leq 0.15$.

(3) The lanthanum phosphate phosphor for vacuum ultraviolet radiation according to the above (1) or (2), wherein the wavelength of the vacuum ultraviolet radiation is 172 nm.

(4) A lanthanum phosphate phosphor for vacuum ultraviolet radiation, which comprises lanthanum phosphate ($LaPO_4$), as a matrix, and terbium (Tb), or cerium (Ce) and terbium (Tb), as an activator, and of which the emission luminance at 150° C. after baking treatment at 800° C. for 20 minutes under excitation with vacuum ultraviolet radiation having a wavelength of at most 200 nm, is within a range of from 100 to 80% of the emission luminance of the phosphor at 25° C. before the baking treatment.

(5) The lanthanum phosphate phosphor for vacuum ultraviolet radiation according to the above (4), which is represented by a composition formula of $(La_{1-x-y}Ce_xTb_y)PO_4$, wherein x and y are numbers which satisfy $0 \leq x \leq 0.2$ and $0.05 \leq y \leq 0.3$, respectively.

(6) The lanthanum phosphate phosphor for vacuum ultraviolet radiation according to the above (4) or (5), wherein the wavelength of the vacuum ultraviolet radiation is 172 nm.

(7) The lanthanum phosphate phosphor for vacuum ultraviolet radiation according to any one of the above (1) to (6), wherein the average particle size of the above phosphor is from 0.5 to 3.0 μm.

(8) A rare gas discharge fluorescent lamp comprising a tubular enclosure transparent to light, having a fluorescent layer formed on an inner wall thereof, and a rare gas sealed in the enclosure, so that the fluorescent layer is excited to emit light by vacuum ultraviolet radiation having a wavelength of at most 200 nm which is radiated by discharge of the rare gas, wherein the fluorescent layer is made of the lanthanum phosphate phosphor for vacuum ultraviolet radiation as defined in any one of the above (1) to (7).

(9) The rare gas discharge fluorescent lamp according to the above (8), wherein the rare gas comprises xenon (Xe).

DETAILED DESCRIPTION OF THE PREFERRED EMBODIMENTS

Figure 1:
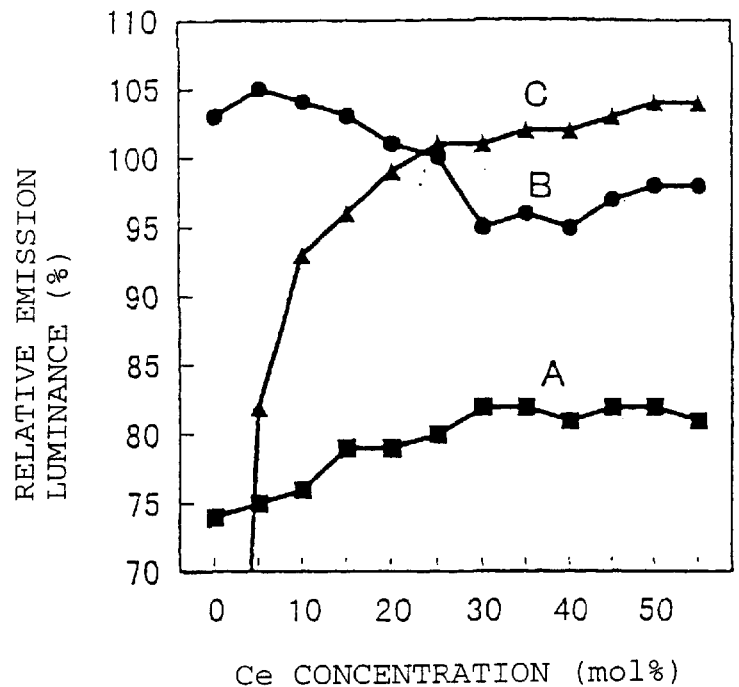
FIG. 1 is a graph illustrating the interrelation between the Ce concentration in the phosphor and the emission luminance when a lanthanum phosphate phosphor is excited with ultraviolet or vacuum ultraviolet radiations having different wavelengths.

The lanthanum phosphate phosphor for vacuum ultraviolet radiation according to the present invention, can be produced in the same manner as a conventional lanthanum phosphate phosphor except that the phosphor raw materials are blended and adjusted so that the Ce concentration in the activator will be a predetermined level.

Namely, the lanthanum phosphate phosphor of the present invention can be produced by a method such as 1) a method (dry method) wherein a starting material mixture comprising an oxide of La or a La compound such as a nitrate, sulfate, halide or hydroxide of La, which is capable of being converted to an oxide of La at a high temperature, an oxide of Ce or a Ce compound such as a nitrate, sulfate, halide or hydroxide of Ce capable of being converted to an oxide of Ce at a high temperature, an oxide of Tb or a Tb compound such as a nitrate, sulfate, halide or hydroxide of Tb capable of being converted to an oxide of Tb at a high temperature, and a phosphorus compound which can readily be a phosphoric acid source at a high temperature, such as ammonium primary phosphate $\{(NH_4)H_2PO_4\}$ or ammonium secondary phosphate $\{(NH_4)_2HPO_4\}$, is packed into a heat resistant container and fired once or a plurality of times at a temperature of from 500 to 1,400° C. in an argon gas atmosphere, a nitrogen gas atmosphere or a reducing atmosphere such as a nitrogen gas containing a small amount of hydrogen gas or a carbon disulfide atmosphere, or 2) a method (wet method) wherein an aqueous solution having the above-mentioned stoichiometrical amounts of the respective oxides of La, Ce and Tb, or the respective compounds of La, Ce and Tb such as nitrates, sulfates, halides or hydroxides, is reacted with a phosphorus compound such as phosphoric acid in the above-mentioned stoichiometrical amount or slightly in excess of the above-mentioned stoichiometrical amount in a solution adjusted so that the pH becomes about 1 to 2, to let a precipitate of mixed phosphates of La, Ce and Tb form, and such a precipitate is baked from 500 to 800° C. to prepare a precursor of the lanthanum phosphate phosphor, which is then fired at a temperature of from 900 to 1,400° C. in a neutral atmosphere or in a reducing atmosphere. In the case where the production is carried out by the above dry method 1), the starting materials i.e. a La compound, a Ce compound and a Tb compound, may be preliminarily dissolved to form a solution containing La, Ce and Tb, then, oxalic acid, ammonia or the like is added thereto to co-precipitate oxalates, hydroxides or the like, which are then calcined to obtain co-precipitated oxides of La, Ce and Tb, and a mixed material comprising such co-precipitated oxides and a phosphorus compound, may be fired. Further, in either method, at the time of firing the starting material compounds, an alkali metal compound or a boron compound may be added as a flux into the starting material compounds to be fired. Further, the method for producing the lanthanum phosphate phosphor of the present invention is not limited to the above methods, and the phosphor may be produced by any one of conventional methods so long as the concentration of Ce as an activator is within the range of the above-mentioned stoichiometrical amount.

FIG. 1 is a graph showing the relation between the concentration of Ce as an activator of a phosphor and the emission luminance (relative value), with respect to a lanthanum phosphate phosphor $\{(La_{1-X-0.15}Ce_xTb_{0.15})PO_4\}$ wherein the concentration of Tb is 15 mol % (y=0.15) as an Example. In FIG. 1, curves A, B and C show cases where the excitation wavelengths are 146 nm 172 nm and 254 nm, respectively. Further, in FIG. 1, in the measurements of curves A, B and C, the relative comparison of the respective excitation intensities can not be made. Accordingly, with respect to curves A, B and C, the relative comparison of the relative luminances among the same curves can be made, but the relative comparison of luminances among the respective curves, can not be made.

As is evident from FIG. 1, the emission luminance of this lanthanum phosphate phosphor depends largely on the Ce concentration (curve C) when excited with ultraviolet rays having a wavelength of 254 nm, but when excited with vacuum ultraviolet radiation having a wavelength of at most 200 nm, the dependency of the emission luminance on the Ce concentration is low (curves B and C). This is considered to be such that when excited with ultraviolet rays having a wavelength of 254 nm, Ce absorbs such ultraviolet rays and transmit the energy to Tb, whereby by the energy transmission from Ce to Tb, a visible light is emitted, and the emission luminance therefore depends largely on the Ce concentration, while, when excited with vacuum ultraviolet radiation having a wavelength of at most 200 nm, Tb is directly excited to emit visible light, whereby it shows a corresponding emission intensity depending upon the concentration of Tb even if Ce is not present, and the dependency of the emission luminance on the Ce concentration is low so long as the concentration of Tb at that time will not change.

And, it is evident that under excitation with ultraviolet rays having a wavelength of 254 nm, when the Ce concentration becomes higher than about 10 mol % relative to the phosphor, the emission luminance improves sharply, and within a certain Ce concentration range, the emission luminance increases as the concentration of Ce increases, while under excitation with vacuum ultraviolet radiation having a wavelength of at most 200 nm, the dependency of the emission luminance on the Ce concentration is relatively small, and particularly under excitation with vacuum ultraviolet radiation having a wavelength of 172 nm, the emission luminance becomes highest when the Ce concentration is low at a level of not more than about 20 mol %.

As mentioned above, with this lanthanum phosphate phosphor, the phenomenon of temperature quenching is distinctly observed when subjected to baking treatment, and the emission luminance decreases as the temperature of the phosphor increases along with the increase of the surrounding temperature. Accordingly, when such a phosphor is used as a fluorescent layer of a fluorescent lamp, the emission luminance tends to decrease as the temperature of the fluorescent layer increases by lighting of the lamp.

Figure 2:
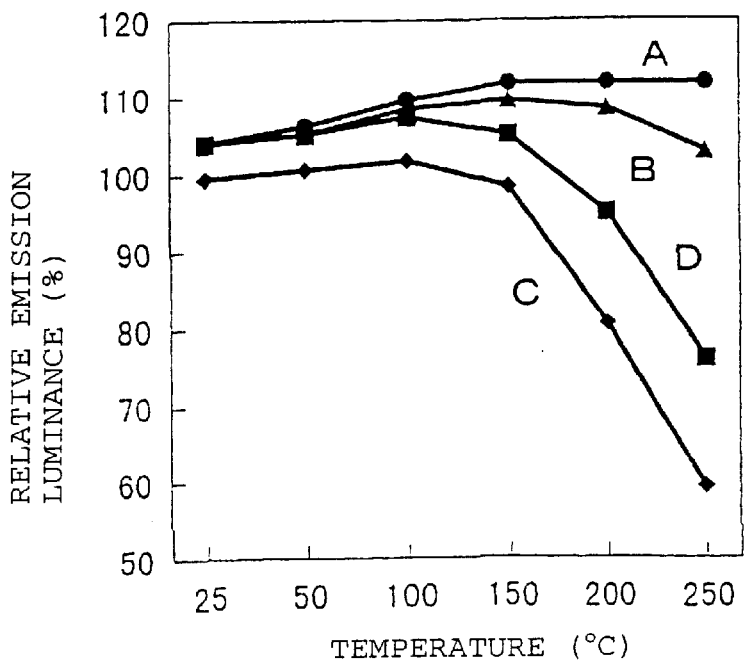
FIG. 2 is a graph showing the temperature dependency of the emission luminance when the lanthanum phosphate phosphor of the present invention is excited with vacuum ultraviolet radiation.

FIG. 2 is a graph showing the relation between the emission luminance and the temperature of the phosphor (the temperature dependency of the emission luminance), when a lanthanum phosphate phosphor $\{(La_{0.7}Ce_{0.15}Tb_{0.15})PO_4\}$ having a Ce concentration of an activator of 15 mol % (x=0.15) and a Tb concentration of 15 mol % (y=0.15) was heated and maintained at the respective predetermined temperatures, and the emission luminances at the respective temperatures were measured respectively. In FIG. 2, curve A represents a case of the phosphor before the baking treatment after the production, and curves B and C represent cases of the phosphors which were preliminarily subjected to baking treatment at temperatures of 500° C. and 800° C., respectively, for 20 minutes, after the production. Further, curve D represents a case wherein the measurements were made with respect to the lanthanum phosphate phosphor included in the peeled fluorescent layer of a used rare gas lamp peeled.

It is evident from FIG. 2 that with the lanthanum phosphate phosphor $\{(La_{0.7}Ce_{0.15}Tb_{0.15})PO_4\}$ (curve A) not subjected to baking treatment after the production, there is no decrease in the emission luminance even when the temperature of the phosphor increases, and thus, no temperature quenching is observed, while in the case of the lanthanum phosphate phosphor $\{(La_{0.7}Ce_{0.15}Tb_{0.15})PO_4\}$ (curve B and C) preliminarily subjected to baking treatment, when the temperature of the phosphor becomes at least about 150° C., the luminance decreases abruptly as compared with the emission luminance at room temperature, and thus, the temperature quenching is remarkable. Further, as is evident from curve D in FIG. 2, this phenomenon of temperature quenching likewise appears also when the lanthanum phosphate phosphor is used as a fluorescent layer for a rare gas lamp.

Figure 3:
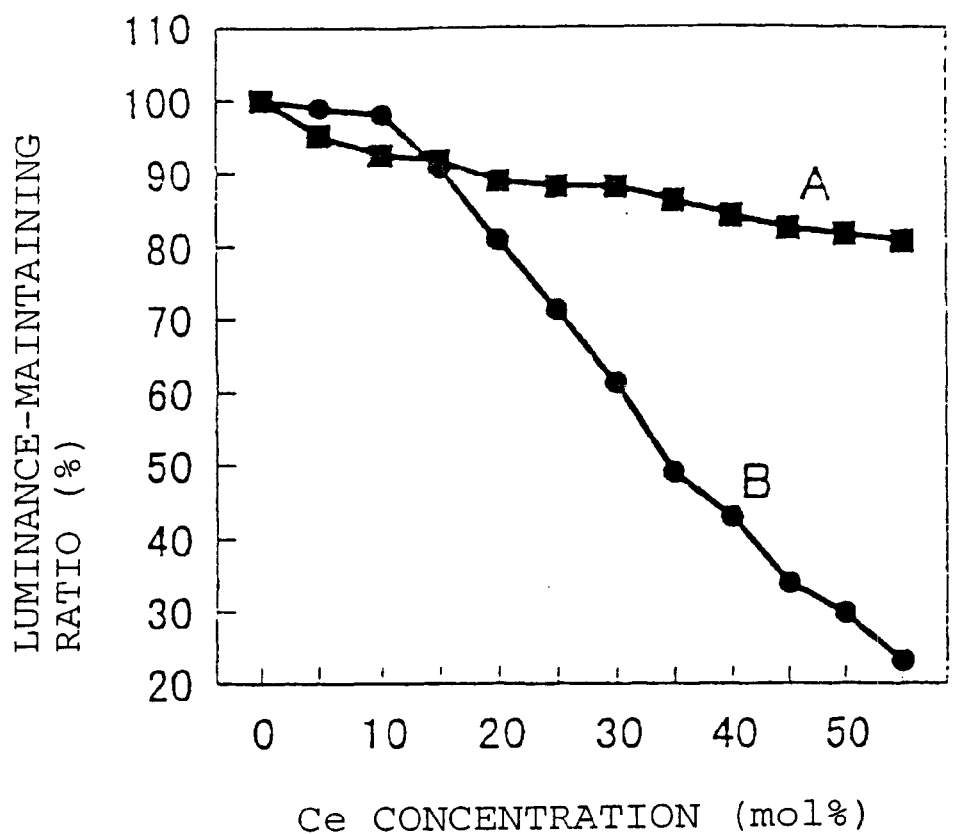
FIG. 3 is a graph showing the Ce concentration dependency of the luminance-maintaining ratio after the baking treatment of the lanthanum phosphate phosphor to prior to the baking treatment.

FIG. 3 is a graph showing the interrelation between the Ce concentration and the luminance-maintaining ratio after baking of lanthanum phosphate phosphors $\{(La_{1-x-0.15}Ce_xTb_{0.15})PO_4\}$ wherein the Tb concentrations are all 15 mol % (y=0.15), and only the Ce concentrations (x) is different, which were preliminarily subjected to baking treatment at 800° C. for 20 minutes.

In the FIG. 3, the luminance-maintaining ratio of the ordinate is a numerical value for the emission luminance of each phosphor after the baking treatment, as measured at 25° C. and 150° C. under excitation with vacuum ultraviolet radiation of 172 nm, and as presented by the relative percentage to the emission luminance when each phosphor before the baking treatment was measured at 25° C., and curve A represents a case where each phosphor after the baking treatment was measured at 25° C., and curve B represents a case where each phosphor after the baking treatment was heated to 150° C. and measured.

It is evident from FIG. 3 that with the lanthanum phosphate phosphor subjected to baking treatment at 800° C. for 20 minutes, when the Ce concentration is at most about 20 mol % (0≦x≦0.2), when the temperature of the phosphor is 150° C., the luminance-maintaining ratio after the baking treatment, is from 100 to 80% of the phosphor not subjected to the baking treatment (see curve B), and thus the temperature quenching is extremely small. And, especially when the Ce concentration is at most about 15 mol % (0≦x≦0.15), even if the temperature of the phosphor increases to 150° C., a decrease of the luminance-maintaining ratio after the baking treatment is small in the same manner as at the time of normal temperature (25° C.) (curve A), and the difference is substantially 0. In FIG. 3, the lanthanum phosphate phosphor having a Tb concentration of 15 mol % (y=0.15) is shown as an example, but the relation between the Ce concentration and the degree of temperature quenching was confirmed to be similar to the case of FIG. 3, even if the Tb concentration was different.

From these results, with the lanthanum phosphate phosphor of the present invention, the Ce concentration of the activator is preferably within a range of from 0 to 20 mol % (0≦x≦0.20), particularly preferably within a range of from 0 to 15 mol % (0≦x≦0.15), in that the emission luminance is high and the degree of temperature quenching is small, under excitation with vacuum ultraviolet radiation having a wavelength of at most 200 nm, particularly a wavelength of 172 nm. Further, from the viewpoint of the emission luminance, the Tb concentration of the coactivator is preferably within a range of from 5 to 30 mol % (0.05≦y≦0.30).

Now, the rare gas lamp of the present invention will be described.

The rare gas lamp of the present invention is the same as a conventional rare gas discharge lamp except that the fluorescent layer to be formed on the inner wall of a glass tube, is made of the above-described lanthanum phosphate phosphor of the present invention. Namely, it is produced in such a manner that the lanthanum phosphate phosphor of the present invention is dispersed together with a binder such as nitrocellulose or ethylene oxide in a solvent such as water or butyl acetate to obtain a phosphor slurry, which is permitted to flow into a light-transmitting slender tube made of e.g. glass and coated on the inner wall of the tube, followed by drying and then by baking at a temperature of from 400 to 600° C. to form a fluorescent layer, then a pair of electrodes are attached at predetermined positions, whereupon the interior of the tube is evacuated, and then a rare gas such as xenon (Xe), argon (Ar) or helium-neon (He—Ne) is sealed in the tube, followed by closing both ends of the tube. Like a conventional rare gas lamp, the electrodes may be attached at both ends of the tube, inside and outside of the tube, or on the outside of the tube.

As the lanthanum phosphate phosphor to be used as the fluorescent layer of a rare gas lamp of the present invention, it is preferred to employ a lanthanum phosphate phosphor having a particle diameter smaller than the conventional one, whereby the light flux from the obtainable rare gas lamp will increase, and a lamp showing an emission of higher luminance can be obtained. Accordingly, as the phosphor to be used for the rare gas lamp of the present invention, it is particularly preferred to employ a lanthanum phosphate phosphor of the present invention having a particle diameter of from about 0.8 to 3.0 μm as represented by an average particle size measured, for example, by an air permeation method employing a subsieve sizer, from the viewpoint of the emission luminance of the obtainable lamp.

With the rare gas lamp of the present invention thus produced, the degree of temperature quenching of the phosphor in the fluorescent layer tends to be small even after the baking treatment to form the fluorescent layer of the lamp, whereby no decrease of light flux of the lamp will take place even when the temperature of the tube wall increases by continuous lighting.

Now, the present invention will be described in further detail with reference to Examples. However, it should be understood that the present invention is by no means restricted to such specific Examples.

EXAMPLE 1

0.425 mol of lanthanum oxide ($La_2O_3$) and 0.0375 mol of tetraterbium heptaoxide ($Tb_4O_7$) were dissolved by an acid, and oxalic acid was added thereto to obtain co-precipitated oxalates of La and Tb, which were calcined at 1,000° C. to obtain co-precipitated oxides of La and Tb. 167.0 g of such co-precipitated oxides and 132.1 g of diammonium hydrogen phosphate {$(NH_4)_2HPO_4$} were thoroughly mixed, then put into an alumina crucible and calcined in air at 700° C. for two hours. The obtained calcined product (precursor) was cooled to room temperature, and 2.4 g of lithium tetraborate ($Li_2B_4O_7$) and 24 g of boric acid ($H_3BO_3$) were added as flux thereto, followed by sufficient mixing, and the mixture was put into a quartz crucible and fired at a temperature of 1,200° C. for two hours in a reducing atmosphere composed of a mixed gas of nitrogen and hydrogen. The obtained calcined product was pulverized, washed, dried and sieved to obtain a lanthanum phosphate phosphor of Example 1 represented by the composition formula of $(La_{0.85}Tb_{0.15})PO_4$ and having an average particle diameter of 2.8 μm as measured by a subsieve sizer.

This lanthanum phosphate phosphor of Example 1 was irradiated with vacuum ultraviolet radiation having a wavelength of 172 nm at room temperature of 25° C., and the emission luminance at that time was measured, whereby it was an emission luminance of 109.1% of the conventional phosphor (the phosphor of the following Comparative Example 1) as measured under the same conditions.

Further, this lanthanum phosphate phosphor of Example 1 was subjected to baking treatment at 800° C. for 20 minutes in air, and then it was likewise irradiated with vacuum ultraviolet radiation having a wavelength of 172 nm, and its emission luminance was measured, whereby it was an emission luminance of 99.8% of the phosphor of Example 1 prior to the baking treatment, thus indicating no substantial decrease of the emission luminance by the baking.

Further, the above lanthanum phosphate phosphor of Example 1 subjected to the baking treatment was packed into a stainless steel cylindrical container having an internal diameter of 25 mm and a depth of 5 mm. This container was heated and maintained at 150° C., and in that state, vacuum ultraviolet radiation having a wavelength of 172 nm was irradiated thereto, whereby the emission luminance was measured, and it was 99.9% of the emission luminance at room temperature of 25° C. before the baking treatment (the luminance-maintaining ratio of 99.9% after the baking treatment), and thus no substantial temperature quenching was observed when heated at 150° C.

Then, 30 parts by weight of the lanthanum phosphate phosphor of Example 1, 200 parts by weight of butyl acetate containing 1.1% nitrocellulose, and 0.7% of a borate type binder, were thoroughly mixed to obtain a phosphor slurry. This phosphor slurry was coated on the inner surface of a glass valve having an inner diameter of about 6.5 mm and subjected to baking treatment at 800° C. for 20 minutes, followed by drying, whereupon Xe was sealed in under a sealing pressure of 10 kP, and electrodes were attached, to obtain a rare gas lamp of Example 1 with 30 W.

The emission luminance after two seconds from lighting of this rare gas lamp of Example 1, was 102.2% of the emission luminance after two seconds from lighting the rare gas lamp of the following Comparative Example 1 prepared in the same manner. Besides, the emission luminance after three minutes from lighting when the temperature within the lamp after the lighting the lamp increased to a predetermined temperature and the discharge state of the sealed gas was substantially stabilized, was 97.5% of the emission luminance after two seconds from lighting, and thus, the decrease of luminance at the initial stage of lighting due to an increase of the temperature within the lamp after lighting, was very small.

EXAMPLE 2

A lanthanum phosphate phosphor of Example 2 represented by a composition formula of $(La_{0.80}Ce_{0.05}Tb_{0.15})PO_4$ and having an average particle diameter of 2.6 μm as measured by a subsieve sizer, was produced in the same manner as the phosphor in Example 1 except that 0.40 mol of lanthanum oxide ($La_2O_3$), 0.0375 mol of tetraterbium heptaoxide ($Tb_4O_7$) and 0.05 mol of secondary cerium oxide ($CeO_2$) were dissolved by an acid, and oxalic acid was added thereto to obtain co-precipitated oxalates of La, Ce and Tb.

This lanthanum phosphate phosphor of Example 2 was irradiated with vacuum ultraviolet radiation having a wavelength of 172 nm at room temperature of 25° C., and the emission luminance was measured, whereby it was an emission luminance of 111.0% of the lanthanum phosphate phosphor of the conventional phosphor (the phosphor of the following Comparative Example 1) measured under the same conditions.

Further, this lanthanum phosphate phosphor of Example 2 was subjected to baking treatment at 800° C. for 20 minutes in air, and then it was likewise irradiated with vacuum ultraviolet radiation having a wavelength of 172 nm, and its emission luminance was measured, whereby it was an emission luminance of 95.1% of the phosphor of Example 2 prior to the baking treatment. Thus, the decrease of the emission luminance by the baking was very small.

Further, the emission luminance at 150° C. when the above lanthanum phosphate phosphor of Example 2 subjected to the baking treatment was irradiated with vacuum ultraviolet radiation having a wavelength of 172 nm, was measured in the same manner as in Example 1, whereby it was 98.8% of the emission luminance at room temperature of 25° C. before the baking treatment (the luminance-maintaining ratio of 98.8% after the baking treatment). Thus, the degree of temperature quenching was very small when heated to 150° C.

Then, a rare gas lamp of Example 2 was prepared in the same manner as the rare gas lamp of Example 1 except that the phosphor of Example 2 was employed instead of the phosphor of Example 1.

The emission luminance after two seconds from lighting of this rare gas lamp was 102.8% of the emission luminance after two seconds from lighting of the rare gas discharge fluorescent lamp of the following Comparative Example 1. Besides, the emission luminance after three minutes from lighting of this lamp was 96.1% of the emission luminance after two seconds from lighting. Thus, the decrease of luminance at the initial stage of lighting due to e.g. an increase of the temperature in the lamp after lighting, was very small.

COMPARATIVE EXAMPLE 1

A lanthanum phosphate phosphor represented by a composition formula of $(La_{0.55}Ce_{0.30}Tb_{0.15})PO_4$ and having an average particle diameter of 3.5 μm as measured by a subsieve sizer, was produced in the same manner as the phosphor in Example 2 except that 0.275 mol of lanthanum oxide ($La_2O_3$), 0.0375 mol of tetraterbium heptaoxide ($Tb_4O_7$) and 0.30 mol of secondary cerium oxide ($CeO_2$) were dissolved by an acid, and oxalic acid was added thereto to obtain co-precipitated oxalates of La, Ce and Tb.

This lanthanum phosphate phosphor of Comparative Example 1 was subjected to baking treatment at 800° C. for 20 minutes in air, and then, it was likewise irradiated with vacuum ultraviolet radiation having a wavelength of 172 nm, and the emission luminance was measured, whereby it was an emission luminance of 88.1% of the phosphor of Comparative Example 1 before the baking treatment. Thus, a remarkable decrease of the emission luminance by the baking, was observed.

Further, the above phosphor of Comparative Example 1 subjected to baking treatment was irradiated with vacuum ultraviolet radiation having a wavelength of 172 nm in the same manner as in Example 1, whereby the emission luminance at 150° C. was measured and found to be 61.4% of the emission luminance at room temperature of 25° C. before the baking treatment (the luminance-maintaining ratio of 61.4% after the baking treatment). Thus, distinct temperature quenching was observed.

Then, a rare gas lamp of Comparative Example 1 was prepared in the same manner as the rare gas lamp of Example 1 except that the phosphor of Comparative Example 1 was used instead of the phosphor of Example 1. The emission luminance after three minutes from lighting, of this rare gas lamp of Comparative Example 1, was 80.1% of the luminance after two seconds from lighting. Thus, the decrease of luminance at the initial stage of lighting due to e.g. an increase of the temperature in the lamp after lighting, was very large.

The lanthanum phosphate phosphor for vacuum ultraviolet radiation, of the present invention, having the above-described construction, has a small temperature dependency of the emission luminance under excitation with vacuum ultraviolet radiation having a wavelength of at most 200 nm, particularly a wavelength of 172 nm, even if it is a phosphor subjected to heat treatment, as compared with a conventional lanthanum phosphate phosphor, and the temperature quenching is little, and it exhibits an emission of higher luminance. By using such a phosphor as a fluorescent layer for a rare gas lamp, it is possible to obtain a stabilized rare gas lamp whereby the decrease of luminance with time and at the initial stage of lighting due to an increase of the temperature of the tube surface or the surrounding temperature at the time of lighting, is little.

The entire disclosure of Japanese Patent Application No. 2001-49435 filed on Jan. 19, 2001 including specification, claims, drawings and summary are incorporated herein by reference in its entirety.

What is claimed is:

1. A lanthanum phosphate phosphor for vacuum ultraviolet radiation, which is represented by a composition formula of $(La_{1-x-y}Ce_xTb_y)PO_4$, wherein x and y are numbers which satisfy $0 \leq x \leq 0.2$ and $0.05 \leq y \leq 0.3$, respectively, and which emits light when irradiated with vacuum ultraviolet radiation having a wavelength of at most 200 nm.

2. The lanthanum phosphate phosphor for vacuum ultraviolet radiation according to claim 1, wherein x is a number which satisfies $0 \leq x \leq 0.15$.

3. The lanthanum phosphate phosphor for vacuum ultraviolet radiation according to claim 1, wherein the wavelength of the vacuum ultraviolet radiation is 172 nm.

4. A lanthanum phosphate phosphor for vacuum ultraviolet radiation, which comprises lanthanum phosphate ($LaPO_4$), as a matrix, and terbium (Tb), or cerium (Ce) and terbium (Tb), as an activator, and of which the emission luminance at 150° C. after baking treatment at 800° C. for 20 minutes under excitation with vacuum ultraviolet radiation having a wavelength of at most 200 nm, is within a range of from 100 to 80% of the emission luminance of the phosphor at 25° C. before the baking treatment.

5. The lanthanum phosphate phosphor for vacuum ultraviolet radiation according to claim 4, which is represented by a composition formula of $(La_{1-x-y}Ce_xTb_y)PO_4$, wherein x and y are numbers which satisfy $0 \leq x \leq 0.2$ and $0.05 \leq y \leq 0.3$, respectively.

6. A rare gas discharge fluorescent lamp comprising a tubular enclosure transparent to light, having a fluorescent layer formed on an inner wall thereof, and a rare gas sealed in the enclosure, so that the fluorescent layer is excited to emit light by vacuum ultraviolet radiation having a wavelength of at most 200 nm which is radiated by discharge of the rare gas, wherein the fluorescent layer is made of the lanthanum phosphate phosphor for vacuum ultraviolet radiation as defined in claim 1.

7. The rare gas discharge fluorescent lamp according to claim 6, wherein the rare gas comprises xenon (Xe).

8. A rare gas discharge fluorescent lamp comprising a tubular enclosure transparent to light, having a fluorescent layer formed on an inner wall thereof, and a rare gas sealed in the enclosure, so that the fluorescent layer is excited to emit light by vacuum ultraviolet radiation having a wavelength of at most 200 nm which is radiated by discharge of the rare gas, wherein the fluorescent layer is made of the lanthanum phosphate phosphor for vacuum ultraviolet radiation as defined in claim 4.

9. The rare gas discharge fluorescent lamp according to claim 8, wherein the rare gas comprises xenon (Xe).

* * * * *